United States Patent
Eckert (10) Patent No.: US 6,473,507 B1
(45) Date of Patent: Oct. 29, 2002

(54) APPARATUS AND METHOD FOR ISOLATING TRANSIENTS ASSOCIATED WITH A DIGITAL SUBSCRIBER LINE

(75) Inventor: Christopher Q. Eckert, Lewisville, TX (US)

(73) Assignee: Efficient Networks, Inc., Dallas, TX (US)

( * ) Notice: Subject to any disclaimer, the term of this patent is extended or adjusted under 35 U.S.C. 154(b) by 42 days.

(21) Appl. No.: 09/692,996

(22) Filed: Oct. 20, 2000

(51) Int. Cl.[7] .................... H04M 1/76; H04M 7/00; H04M 9/00
(52) U.S. Cl. ............ 379/416; 379/399.01; 379/93.05; 379/93.09; 379/402; 379/405; 379/406.16
(58) Field of Search ................. 379/398–402, 379/405, 93.09, 406.01–406.16, 416, 93.05

(56) References Cited

U.S. PATENT DOCUMENTS

| | | | |
|---|---|---|---|
| 5,627,501 A | * | 5/1997 | Biran et al. |
| 5,678,198 A | * | 10/1997 | Lemson |
| 5,889,856 A | * | 3/1999 | O'Toole et al. |
| 5,974,139 A | * | 10/1999 | McNamara et al. |
| 6,144,734 A | * | 11/2000 | Beeman |
| 6,144,735 A | * | 11/2000 | Bella |
| 6,317,464 B1 | * | 11/2000 | Le et al. |
| 6,177,801 B1 | * | 1/2001 | Chong |

* cited by examiner

Primary Examiner—Forester W. Isen
Assistant Examiner—Ramnandan Singh
(74) Attorney, Agent, or Firm—Baker Botts L.L.P.

(57) ABSTRACT

A communication apparatus includes circuitry operable to facilitate communication over a digital subscriber line. The apparatus also includes a filter operable to be coupled between the circuitry and the digital subscriber line. The filter has a corner frequency and is operable to attenuate transients associated with the circuitry when the apparatus is in use. The filter is tuned to an impedance of the circuitry.

37 Claims, 6 Drawing Sheets

APPARATUS AND METHOD FOR ISOLATING TRANSIENTS ASSOCIATED WITH A DIGITAL SUBSCRIBER LINE

CROSS-REFERENCE TO RELATED APPLICATIONS

This application is related to U.S. application Ser. No. 09/385,223 filed on Aug. 27, 1999 for a "System and Method for Selective Filter Isolation."

TECHNICAL FIELD OF THE INVENTION

This invention relates generally to communications systems, and more particularly to an apparatus and method for isolating transients associated with a digital subscriber line.

BACKGROUND OF THE INVENTION

Digital subscriber line (DSL) technology is a communications format designed to allow a customer to transmit analog voice and data signals over a twisted-pair telephone line. DSL technology provides a significant advantage over other digital communications technologies because it supports the simultaneous or near simultaneous transmission of both analog and digital signals. Also, by using existing telephone lines, DSL provides noticeable cost savings over other high-speed transmission alternatives, such as cable modems and fiber to the neighborhood, which require the placement of new high-speed and expensive cabling.

Different protocols may be used to transmit information using DSL technology. For example, the Asymmetric Digital Subscriber Line (ADSL) protocol typically provides larger bandwidth in the downstream direction at the expense of bandwidth in the upstream direction. This generally allows a customer to receive information at a faster rate than the customer can transmit information. Full rate ADSL, sometimes referred to as "ADSL heavy," utilizes a splitter at the customer's premises to separate the higher frequency DSL signals from the lower frequency voice signals. The splitter protects the DSL signals from interference associated with lower frequency voice line transients caused, for example, when a telephone rings. A lower-cost, less complex version of full ADSL is known as "ADSL Lite," which reduces or eliminates the need for a splitter at the customer's premises.

In actual implementation, both full ADSL and ADSL Lite suffer from interference between the analog voice signals and the higher frequency DSL signals. One approach to eliminating this interference is to permanently place a low pass filter in series with each telephone at the customer's premises. These filters are connected externally to the telephones and are designed to provide minimally acceptable performance over a wide range of telephones.

One problem with this approach is that by designing the filters to work with a wide variety of telephones, it is typically difficult to get optimal or near optimal performance with any particular combination of filters and telephones. Telephone equipment manufacturers develop and produce different types of telephones. A telephone produced by one manufacturer often has a different impedance than other telephones developed by other manufacturers. As a result, different DSL customers may use telephones with widely varying impedances. The varying impedances of the telephones affect the design of the low pass filters because the impedance of the telephone affects how well the filters remove transients from a signal. The low pass filters are typically tuned to a wide range of frequencies so that the filters may be used with the different types of telephones. Because the filters are tuned to a wide range of frequencies, the filters may allow some noise to affect the analog voice or DSL signals communicated over the telephone lines.

Another problem with this approach is that the filters may be unsuitable for certain telephones. If a filter is tuned to a frequency range that is too narrow, the filter may adversely affect the analog voice signals transmitted by the telephone. Beyond that, the filter might actually filter out the analog voice signals. As a result, the filter may be unsuitable for use with telephones that have high or low impedances.

A further problem with this approach is that the filter needs to be physically installed at the customer's premises. This may increase the expense of providing DSL service to a customer because a technician may need to visit the customer's premises to install the low pass filter.

In addition, when a customer's premises have more than one telephone, the filters associated with telephones that are not in use may create resonant circuits and cause interference in telephones that are in use. This interference not only hinders the performance of the telephones, but it may also create irregularities and errors in the higher frequency DSL signals communicated to and from the customer's premises.

SUMMARY OF THE INVENTION

The present invention recognizes a need for an improved apparatus and method for isolating transients associated with a digital subscriber line. The present invention substantially reduces or eliminates problems and disadvantages associated with prior systems and methods.

In one embodiment of the invention, a communication apparatus includes circuitry operable to facilitate communication over a digital subscriber line. The apparatus also includes a filter operable to be coupled between the circuitry and the digital subscriber line. The filter has a corner frequency and is operable to attenuate transients associated with the circuitry when the apparatus is in use. The filter is tuned to an impedance of the circuitry.

In a particular embodiment, the communication apparatus also includes a switch coupled to the filter. The switch is operable to effect a change in the corner frequency of the filter depending on whether the apparatus is in use. The change in the corner frequency operates to attenuate parasitic interference associated with a second apparatus coupled to the digital subscriber line when the second apparatus is not in use.

Numerous technical advantages can be gained through various embodiments of the invention. Various embodiments of the invention may exhibit none, some, or all of the following advantages. For example, in one embodiment of the invention, an apparatus is provided that may be used with a digital subscriber line. In a particular embodiment, the apparatus is a telephone. The telephone includes a filter, which may allow the telephone to be used without causing excessive interference with DSL signals communicated over the digital subscriber line. Also, because the telephone includes a filter, this may help reduce the cost of providing DSL service to a customer. A technician need not physically install a filter at the customer's premises.

Some embodiments of the invention may also provide a filter that works more effectively. The filter in the apparatus is tuned to the impedance of the apparatus. This may narrow the frequency range of the filter and allow the filter to remove more noise from the voice and DSL signals communicated over the digital subscriber line. Further, because the filter is tuned to the impedance of the apparatus, the invention helps to reduce or eliminate the possibility that a filter will be unsuitable for use with telephones having high or low impedances.

In addition, some embodiments of the invention reduce or eliminate the parasitic interference associated with the use of multiple filters coupled to multiple telephones. For example, the invention can be designed so that the inductance of a filter increases when the telephone is not in use. This reduces the corner frequency of the filter to a point where parasitic interference associated with that filter does not affect other telephones that are in use. Also, the invention can be designed so that the capacitance of the filter increases when the telephone is in use. This also reduces the corner frequency of the filter to a point where the filter operates to attenuate parasitic interference associated with other telephones not in use.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
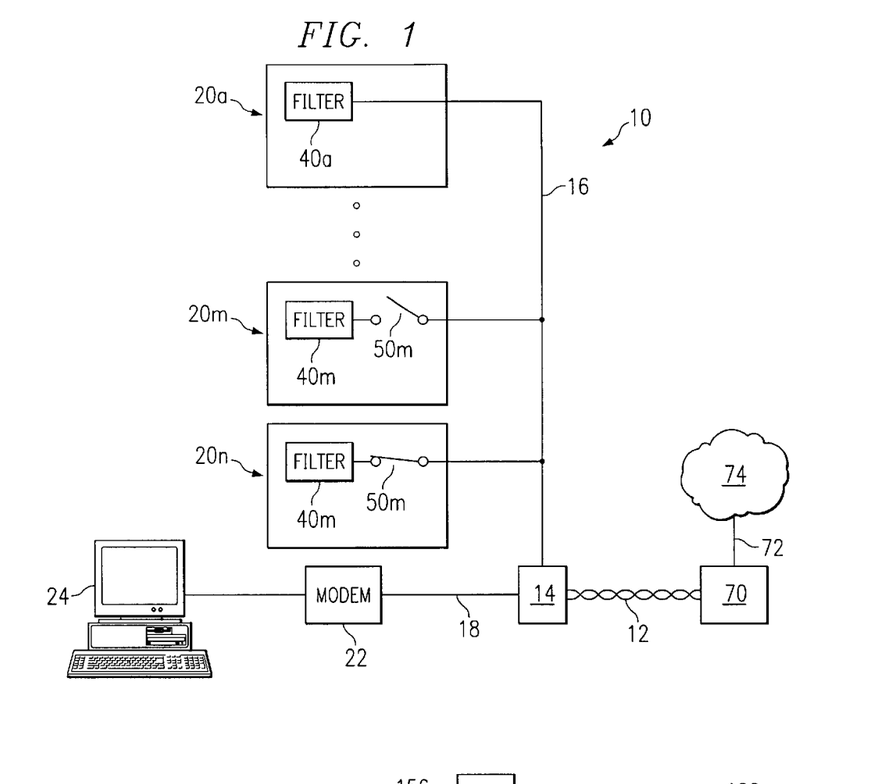
FIG. 1 is a block diagram illustrating an exemplary communications system.

FIG. 1 is a block diagram illustrating an exemplary communications system 10. In the illustrated embodiment, system 10 includes a digital subscriber line 12, a network interface device 14, communications links 16 and 18, one or more telephones 20a–20n, a modem 22, and a computer 24. Other embodiments of system 10 may be used without departing from the scope of the present invention. For example, although the present invention is described with respect to a telephone 20, the present invention may be implemented in any device operable to communicate over digital subscriber line 12. The present invention may, for example, be implemented in an answering machine, a fax machine, a satellite dish, or a personal television receiver.

In one aspect of operation, each telephone 20 includes a filter 40. Filter 40 allows telephone 20 to transmit and receive analog voice signals over digital subscriber line 12 at approximately the same time that computer 24 transmits and receives digital signals over digital subscriber line 12. Filter 40 may be tuned to the particular frequency characteristics of telephone 20. This may allow filter 40 to provide optimum or near optimum performance with telephone 20.

Digital subscriber line 12 is coupled to network interface device 14 and a central office 70. In this document, the phrase "digital subscriber line" includes any communications system operable to facilitate approximately simultaneous communication of both analog voice telephony signals and digital signals. For example, the invention may be implemented in systems using full-rate Asymmetric DSL (ADSL), ADSL Lite, High-bit-rate DSL (HDSL), HDSL2, and Carrierless Amplitude and Phase (CAP) modulation. Although this description describes the invention as it relates to particular implementations of ADSL transmission, the invention contemplates other later revisions, modifications, enhancements, or new types of approximately simultaneous analog/digital transfer techniques.

Digital subscriber line 12 facilitates communication between network interface device 14 and central office 70. Digital subscriber line 12 may comprise any communications medium operable to facilitate approximately simultaneous communication of both analog and digital signals, such as a twisted-pair copper telephone line.

Central office 70 is coupled to a network 74 over a communications link 72. In this document, the term "couple" refers to any direct or indirect communication between two or more elements in system 10, whether or not those elements physically contact one another. Network 74 may include any suitable wireline or wireless system that supports communication between network elements using ground-based and/or space-based components. For example, network 74 may be a public switched telephone network (PSTN), an integrated services digital network (ISDN), a local area networks (LAN), a wide area network (WAN), a global computer network such as the Internet, or any other communications system or systems at one or more locations.

Network interface device 14 is coupled to digital subscriber line 12, telephones 20 over communications link 16, and modem 22 over communications link 18. Network interface device 14 facilitates communication between telephones 20 and modem 22 over subscriber line 12. In one embodiment where digital subscriber line 12 supports full rate ADSL, network interface device 14 typically includes a splitter that separates the analog voice signals from the digital DSL signals. In another embodiment where digital subscriber line 12 supports ADSL Lite, digital subscriber line 12 may terminate directly into communications links 16 and 18 without using a splitter at network interface device 14.

Communications link 16 couples telephones 20 and network interface device 14. In one embodiment, communications link 16 comprises an analog telephone line facilitating communication between telephones 20 and digital subscriber line 12. In the illustrated embodiment, telephones 20a and 20m are depicted in an "on-hook" or "inactive" state, where telephones 20a and 20m are currently not in use, In contrast, telephone 20n is depicted in an "off-hook" or "active" state, where telephone 20n is currently in use and communicating over communication link 16. In this document, the term "active" refers to operating in a state where information is transmitted or received by a device, and "inactive" refers to operating in a state where information is not transmitted or received by a device. For example, a telephone 20 may be active when sending or receiving a call, and a fax machine may be active when transmitting or receiving information over digital subscriber line 12.

Communications link 18 couples modem 22 and network interface device 14. In one embodiment, system 10 implements full rate ADSL, and communications link 18 may comprise a digital communications line operable to facilitate digital communications between modem 22 and network interface device 14. In another embodiment, system 10 implements ADSL Lite, and communications link 18 may comprise a communications link similar to communications link 16.

Modem 22 is coupled to communications link 22 and computer 24. Modem 22 may comprise any hardware, software, firmware, or combination thereof operable to facilitate communication between computer 24 and central office 70 over subscriber line 12. Computer 24 may comprise, for example, a desktop computer, a laptop computer, a personal digital assistant, or any other computing or communicating device. Modem 22 could be separate from or integral with computer 24.

Operation of one or more telephones 20 in an off-hook state sometimes generates transient signals. If these transients were allowed to propagate to digital subscriber line 12, the transients could disrupt service or otherwise cause errors in the communication of higher frequency DSL signals. To address this issue, each telephone 20 includes a filter 40. Filters 40 operate to attenuate low frequency transients associated with off-hook operation of telephones 20, preventing those transients from propagating back to digital subscriber line 12 and disrupting the DSL signal. This helps to isolate digital subscriber line 12 from the effects of these low-frequency transients. In this document, the term "isolate" refers to a reduction in the isolated element's ability to communicate or affect other circuit elements from which the element is said to be isolated during the time that the element is isolated. Also, the phrases "low frequency" and "high frequency" are used to denote relative frequencies, and are not intended to correspond to any particular frequency range. In a particular embodiment, analog signals have a frequency below 20 kHz, while DSL signals have a frequency between 20 kHz and 10 MHz. Other frequencies may be used in system 10 without departing from the scope of the present invention.

In one embodiment, each filter 40 comprises a low-pass filter having a corner frequency below the frequency of the lowest frequency DSL signals. In another embodiment, filters 40 could comprise any other type of filter operable to protect DSL signals from transients associated with telephones 20 in an off-hook state, such as a band pass filter, an adaptive filter, or a digital signal processor. Each filter 40 may be tuned to an impedance of the associated telephone 20. In this document, the term "tune" refers to filter 40 being operable to help reduce or prevent transients from promulgating to digital subscriber line 12 without preventing voice telephony signals from promulgating to digital subscriber line 12. Each filter 40 can be tuned to the particular frequency characteristics of the associated telephone 20, which allows each filter 40 to provide optimum or near optimum performance with that telephone 20.

In another embodiment, telephones 20m and 20n include a switch 50. Although switch 50 couples filter 40 to communications link 16 in the illustrated embodiment, filter 40 could also be coupled between switch 50 and communications link 16. In systems with multiple telephones 20, a telephone 20n in an off-hook state can experience parasitic interference when one or more other telephones 20a–20m remain in an on-hook state. If filter 40 is designed to terminate with an impedance approximately equal to the off-hook impedance of the telephone 20, telephone 20m in an on-hook state may have a different impedance than telephone 20n in an off-hook state. When telephone 20m is in an on-hook state, filter 20m is not properly terminated, and this may result in a resonant circuit that generates parasitic interference. If left unchecked, the parasitic interference created by the non-terminated on-hook telephones 20a–20m can disrupt the operation of the off-hook telephone 20n. The interference may also adversely affect the higher frequency DSL signals.

Switch 50 may comprise any circuitry operable to manipulate the corner frequency of an associated filter 40 depending on the state of telephone 20. Through this operation, telephone 20n operating in an off-hook state is isolated from parasitic interference caused by unterminated filters 40 in telephones 20a–20m operating in an on-hook state. In addition, each switch 50 may be designed to ensure that transients generated by telephone 20n operating in an off-hook state continue to be attenuated by the associated filter 40, thus reducing or eliminating disruption of higher frequency digital signals.

As a result, system 10 provides an advantage of protecting digital subscriber line 12 from low frequency transients typically associated with telephones 20 in an off-hook state, while reducing or eliminating parasitic interference associated with resonant circuits created when one or more telephones 20m remain in an on-hook state. Through, for example, appropriate choice of system components that determine the corner frequencies of filters 40, system 10 can be implemented without disrupting on-hook services, such as "caller ID" and "call-waiting ID," to telephones 20 remaining on-hook.

Figure 2:
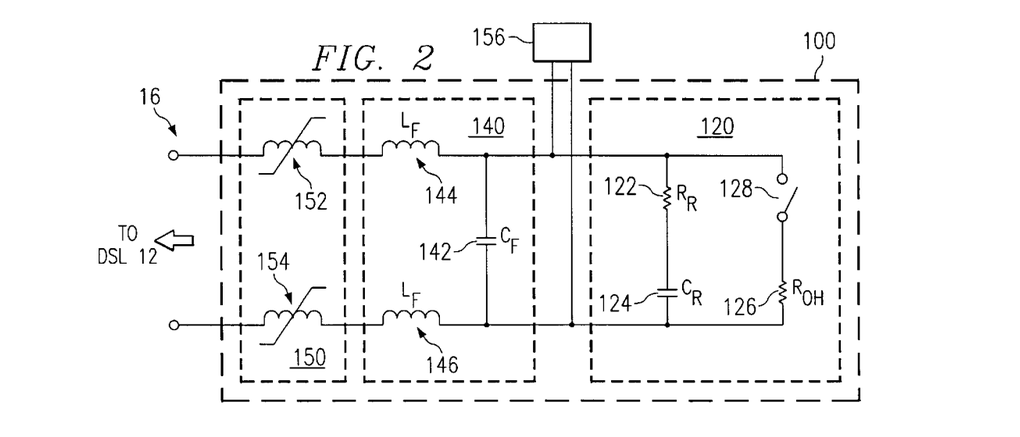
FIG. 2 is a schematic diagram illustrating an exemplary telephone useful, for example, in an ADSL Lite application.

FIG. 2 is a schematic diagram illustrating an exemplary telephone 100 useful, for example, in an ADSL Lite application. In the illustrated embodiment, telephone 100 includes an equivalent circuit 120, a filter 140, and a switch 150. Other embodiments of telephone 100 may be used without departing from the scope of the present invention. For example, telephone 100 shown in FIG. 2 may represent telephones 20m and 20n from FIG. 1. In another embodiment, telephone 100 may include circuit 120 and filter 140 without switch 150, which represents telephone 20a from FIG. 1.

Equivalent circuit 120 is a schematic representation of various components of a telephone. Circuit 120 includes a ringer resistance ($R_R$) 122 and a ringer capacitance ($C_R$) 124, which together represent the ringer load of telephone 100. An off-hook resistance ($R_{OH}$) 126 represents the off-hook impedance associated with telephone 100. A switch 128 represents the hook switch of telephone 100. Switch 128 remains open while telephone 100 is in an on-hook state, and switch 128 closes when telephone 100 goes off-hook.

Filter 140 is coupled between circuit 120 and digital subscriber line 12. The components of filter 140 are selected to give filter 140 a corner frequency sufficient to isolate digital subscriber line 12 from low frequency transients typically associated with telephone 100 operating in an off-hook state. In addition, components of filter 140 may be selected to tune filter 140 to the particular frequency characteristics of telephone 100. This may allow, for example, filter 140 to prevent transients from promulgating to digital subscriber line 12 without preventing voice signals from promulgating to digital subscriber line 12. Filter 140 may provide optimum or near optimum performance in telephone 100.

In the illustrated embodiment, filter 140 includes filter inductances ($L_F$) 144 and 146 coupled in series with communications link 16, and a filter capacitance ($C_F$) 142 coupled in series with filter inductances 142 and 144. In the illustrated embodiment, filter 140 comprises an even order filter having filter capacitance 142 coupled in parallel with circuit 120. This configuration provides an advantage of filter capacitance 142 acting to moderate nonlinearities associated with hook switch 128. In one embodiment, filter 140 comprises any even order filter, such as a second, fourth, or sixth order filter. Also, in one embodiment, filter 140 is tuned to the frequency characteristics of telephone 100. This narrows the range of frequencies that filter 140 allows to promulgate to digital subscriber line 12. By tuning filter 140 to the frequency characteristics of telephone 100, filter 140 reduces or eliminates the likelihood that filter 140 will prevent analog voice signals from being communicated over digital subscriber line 12. A manufacturer of telephone 100 can determine with greater certainty whether a filter 140 will filter part or all of the analog voice signals.

Switch 150 is coupled between circuit 120 and digital subscriber line 12. In the illustrated embodiment, switch 150 comprises a pair of saturable core inductors 152 and 154. Although the illustrated embodiment utilizes two separate saturable core inductors 152 and 154, these separate inductors could be combined using a single inductor having two windings. Saturable core inductors 152 and 154 are designed to saturate (e.g., their impedance approaches zero) upon introduction of a particular current level. Prior to being exposed to a saturating direct current, saturable core inductors 152 and 154 exhibit a particular inductance or impedance ($L_{SC}$). In this embodiment, saturable core inductors 152 and 154 are designed to saturate upon introduction of a current drawn when an associated telephone 100 operates in an off-hook state. This current may, for example, comprise a 25 milli-amp current.

The saturating current level of saturable core inductors 152 and 154 can be determined through various design criteria, such as the permeability of the inductor's core material, the shape of the inductor, and the type and number of windings. In one embodiment, each saturable core inductor 152 and 154 comprises a non-gapped toroid inductor having a core material exhibiting an approximately square hysteresis characteristic, such as ferrite having a permeability of 900 $\mu$. Saturable core inductors 152 and 154 may each include, for example, approximately 100 turns of AWG 26 wire. Other configurations and materials could be used without departing from the scope of the invention.

In the illustrated embodiment, saturable core inductors 152 and 154 are coupled in series with filter 140 so that the inductance ($L_{SC}$) of saturable core inductors 152 and 154 adds to the inductance ($L_F$) of filter inductors 144 and 146. Prior to application of a saturating current, filter 140 exhibits a corner frequency of:

$$1/(2\Omega)((L_{SC}+LF)C_F)^{1/2}.$$

Upon introduction of a saturating current, the inductance $L_{SC}$ falls to near zero, driving the corner frequency of filter 140 to:

$$1/(2\Omega)(L_F C_F)^{1/2}.$$

Through appropriate component selection, telephones 100 can be designed to isolate digital subscriber line 12 from transients associated with a telephone 100 operating in an off-hook state, while also reducing or eliminating parasitic interference associated with other telephones 100 remaining in an on-hook state. For example, the inductance ($L_{SC}$) of saturable core inductors 152 and 154 can be selected to provide a relatively high impedance. While the associated telephone 100 remains on-hook (e.g., no saturating current), the corner frequency of filter 140 remains relatively low. This attenuates the parasitic interference caused by the unterminated nature of filter 140 while telephone 100 is on-hook.

In addition, telephone 100 operating in an off-hook state will introduce a saturating current to saturable core inductors 152 and 154, driving their inductance ($L_{SC}$) near zero. This increases the corner frequency of filter 140 coupled to the off-hook telephone 100 to a level where voice level frequencies are allowed to pass, while transients associated with the off-hook telephone 100 are prevented from interfering with higher frequency DSL information.

The impedance of saturable core inductors 152 and 154 may further be selected so as to isolate digital subscriber line 12 from filter 140 and telephone 100 in an on-hook state. This may be desirable, for example to minimize attenuation of higher frequency digital signals. In general, the greater the number of telephones 100 connected in parallel to one another, the lower the impedance of their parallel combination. Setting the impedance of saturable core inductors 152 and 154 sufficiently high can help reduce or eliminate attenuation of higher frequency digital signals, which might otherwise occur where several telephones 100 are coupled in parallel with digital subscriber line 12.

In the illustrated embodiment, telephone 100 also includes a connector 156 coupled to filter 140. Connector 156 is operable to facilitate communication between an additional device and digital subscriber line 12. The additional device may, for example, include an answering machine or a fax machine. Because filter 140 is coupled between connector 156 and digital subscriber line 12, the additional device coupled to connector 156 may be used without interfering with the higher frequency DSL signals communicated over digital subscriber line 12.

Figure 3:
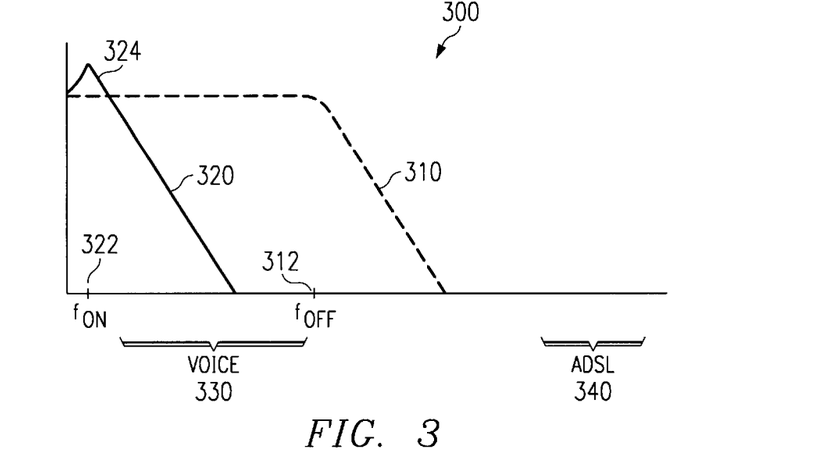
FIG. 3 is a frequency plot illustrating an exemplary frequency response of terminated filters associated with off-hook telephones and an exemplary frequency response of unterminated filters associated with on-hook telephones.

FIG. 3 is a frequency plot 300 illustrating an exemplary frequency response 310 of terminated filters 140 associated with off-hook telephones 100 and an exemplary frequency response 320 of unterminated filters 140 associated with on-hook telephones 100. Components of filter 140 can be selected to provide any desired frequency response. As graphically shown in FIG. 3, while telephone 100 operates in an off-hook state, filter 140 exhibits a corner frequency 312 of $f_{off}$ and allows voice frequency level signals 330 to pass. Filter 140 also attenuates any transients that could adversely affect higher frequency DSL information 340. In addition, filter 140 associated with telephone 100 operating in an on-hook state exhibits a corner frequency 322 of $f_{on}$, which reduces or eliminates parasitic interference 324 associated with the unterminated nature of the filter 140.

Filter 140 may be tuned to the frequency characteristics of telephone 100. In this embodiment, the corner frequency 312 of filter 140 is near the upper end of the voice frequency level signals 330. This allows voice frequency level signals 330 to pass, and filter 140 does not filter voice frequency level signals 330. Also, filter 140 will remove transients having a frequency above corner frequency 312. By tuning filter 140 to the frequency characteristics of telephone 100, filter 140 may prevent transients from promulgating to digital subscriber line 12 without preventing voice signals from promulgating to digital subscriber line 12. Filter 140 may provide optimum or near optimum performance in telephone 100.

Figure 4:
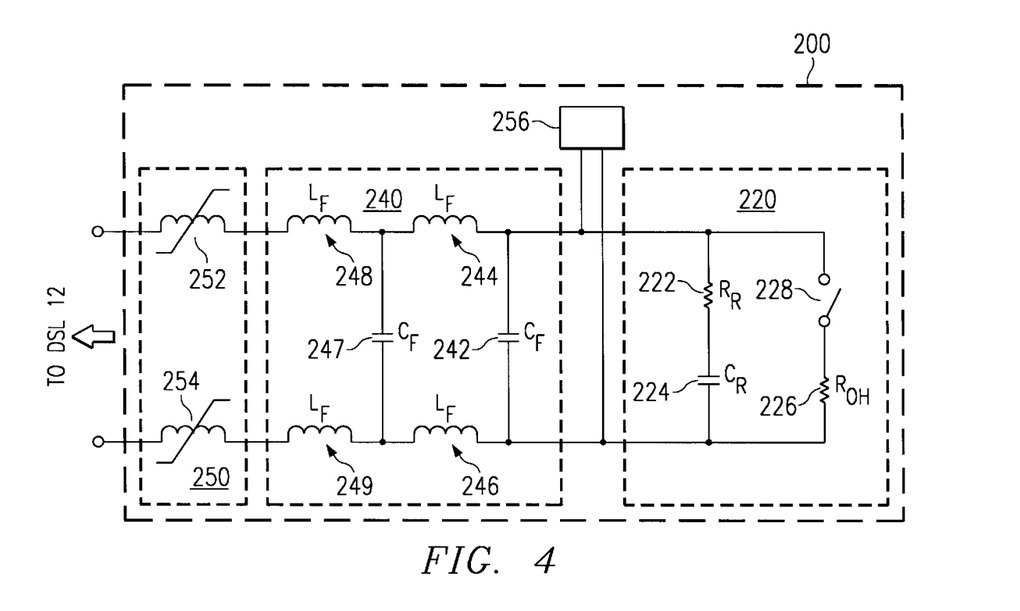
FIG. 4 is a schematic diagram illustrating an exemplary telephone useful, for example, in a full rate ADSL application.

FIG. 4 is a schematic diagram illustrating an exemplary telephone 200 useful, for example, in a full rate ADSL application. In the illustrated embodiment, telephone 200 includes an equivalent circuit 220, a filter 240, and a switch 250. In another embodiment, telephone 200 could include equivalent circuit 200 and filter 240, without switch 250.

Circuit 220 and switch 250 may be the same or similar to circuit 120 and switch 150 of telephone 100 in FIG. 2. Filter 240 is also similar in function to filter 140 of telephone 100. To better facilitate operation under full rate ADSL, filter 240 comprises a fourth order filter. Like filter 140 in telephone 100, filter 240 can be advantageously designed to couple one or more capacitors 242 and 247 in parallel with equivalent circuit 220 to moderate nonlinearities typically associated with hook switch 228. In addition, filter 240 may be tuned to the frequency characteristics of telephone 200. This allows filter 240 to remove transients from digital subscriber line 12 without removing voice signals from digital subscriber line 12. Filter 240 may provide optimum or near optimum performance in telephone 200.

As an example of component values that could be selected in telephone 200, each of saturable core inductors 252 and 254 could each comprise, for example, an approximately 8 milli-Henry inductor; filter inductances 244–249 could each comprise, for example, an approximately 8.6 milli-Henry inductor; and filter capacitances 242 and 247 could each comprise, for example, an approximately 0.022 micro-Farad capacitor. In another embodiment, filter inductances 244–249 could each comprise, for example, an approximately 4.3 milli-Henry inductor; filter capacitance 242 could comprise, for example, an approximately 0.123 micro-Farad capacitor; and filter capacitance 247 could comprise, for example, an approximately 0.05 micro-Farad capacitor. The configuration and component values of filter 240 and switch 250 are presented for illustrative purposes only. Other configurations and component values could be used without departing from the scope of the invention.

In the illustrated embodiment, telephone 200 may also include a connector 256 coupled to filter 240. Connector 256 may be the same or similar to connector 156 of telephone 100 of FIG. 2. Connector 256 is operable to facilitate communication between an additional device, such as an answering machine or a fax machine, and digital subscriber line 12.

Figure 5:
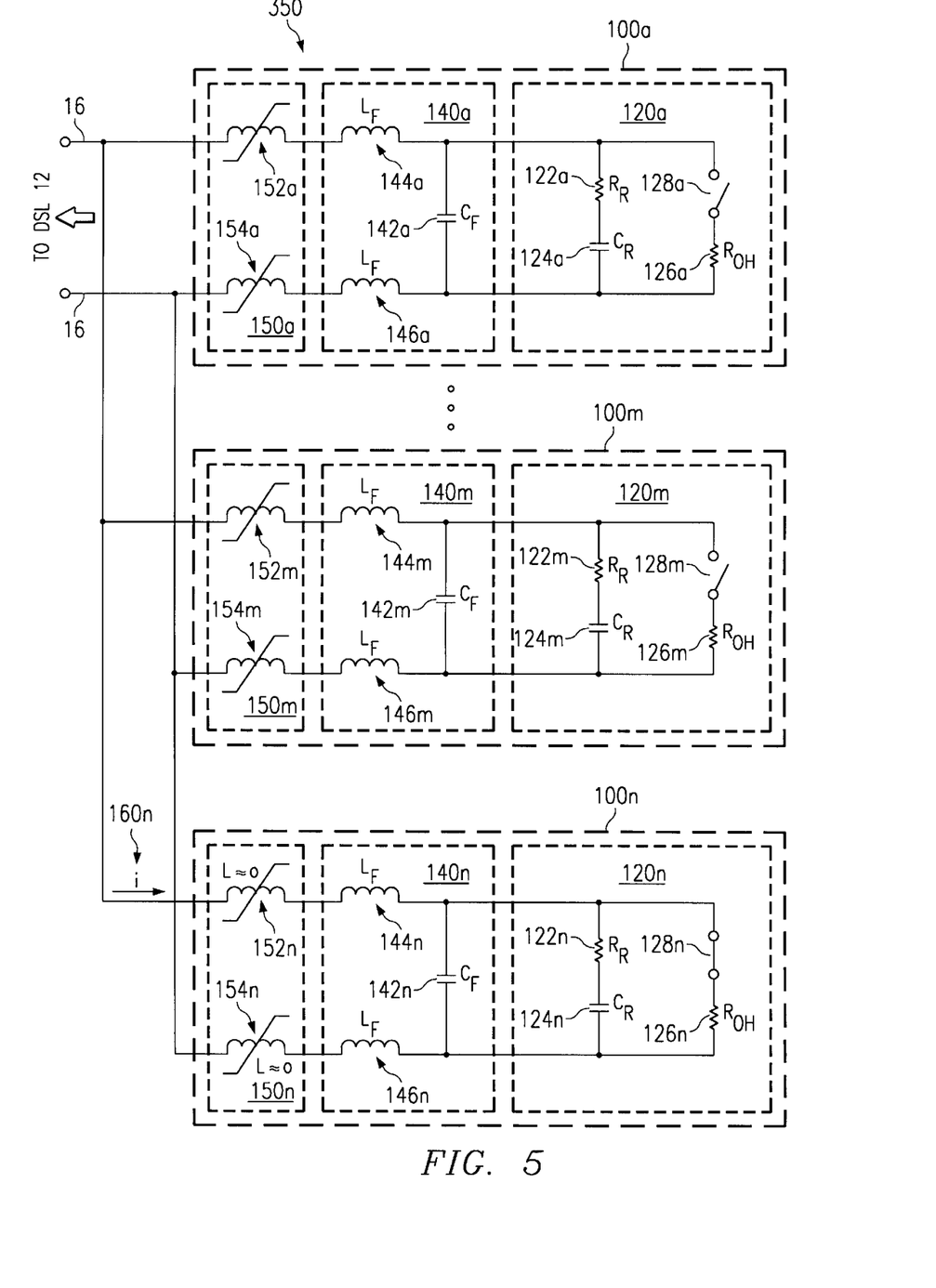
FIG. 5 is a schematic diagram illustrating a circuit operable to facilitate communications using a digital subscriber line and a plurality of telephones.

FIG. 5 is a schematic diagram illustrating a circuit 350 operable to facilitate communications using digital subscriber line 12 and a plurality of telephones 100. Circuit 350 includes a plurality of telephones 100a–100n, which are coupled in parallel with communications link 16. Any number of telephones 100 could be used without departing from the scope of the invention.

Equivalent circuits 120, filters 140, and switches 150 may be the same or similar to the elements described with reference to FIG. 2. Each telephone 100 includes a ringer load, represented by ringer resistance 122 and ringer capacitance 124. Each telephone 100 also includes a hook switch 128 and an off-hook ringer impedance 126.

Each filter 140 includes first filter elements 144 and 146 coupled in series with communications link 16, and a second filter element 142 coupled in series with first filter elements 144 and 146 and in parallel with circuit 120. In this embodiment, first filter elements 144 and 146 comprise inductors, and second filter element 142 comprises a capacitor. Component values of first filter elements 144 and 146 and second filter element 142 can be selected to provide desired filter characteristics, depending on the particular application. In one embodiment, component values of first filter elements 144 and 146 and second filter element 142 are selected to tune filter 140 to the frequency characteristics of telephone 100. This may allow, for example, filter 140 to prevent transients from promulgating to digital subscriber line 12 without preventing voice signals from promulgating to digital subscriber line 12.

Each switch 150 comprises a pair of saturable core inductors 152 and 154. Saturable core inductors 152 and 154 have an impedance sufficient to isolate filter 140 from the rest of circuit 350 when the associated telephone 100 is in an on-hook state. Upon introduction of a saturating current, each saturable core inductor 152 and 154 saturates, driving its impedance to near zero, and increasing the corner frequency of the associated filter 140. In the illustrated embodiment, saturable core inductors 152 and 154 are designed to saturate upon an introduction of a current drawn when the associated telephone 100 goes off-hook (e.g., when hook switch 128 closes). In the illustrated embodiment, this current may comprise, for example, 25 milli-amps.

In the example shown in FIG. 5, telephones 100a–100m are depicted as being in an on-hook state. The on-hook state is shown in FIG. 5 by open hook switches 128a–128m. Telephone 100n, in contrast, is depicted as being in an off-hook state. The off-hook state is shown by closed switch 128n. When telephone 100n is in an off-hook state, there is a potential that low-frequency transients will be created at telephone 100n. Filter 140n and switch 150n help to prevent these low-frequency transients from promulgating to digital subscriber line 12.

Prior to telephone 100n going off-hook, saturable core inductors 152n and 154n are in a relatively high impedance state, which results in a relatively low corner frequency of the associated filter 140n. When telephone 100n goes off-hook and hook switch 128n closes, telephone 100n draws a current 160n associated with the off-hook state of telephone 100n. Telephone 100n may be designed such that the current 160n associated with an off-hook condition of telephone 100n operates to saturate saturable core inductors 152n and 154n. When saturable core inductors 152n and 154n saturate, their impedance is driven near zero, and the corner frequency of the associated filter 140n is increased. This reduces or eliminates the isolating effects of switch 150n and allows voice frequency level signals to pass. At the same time, the corner frequency of filter 140n remains low enough to isolate digital subscriber line 12 from transients caused by off-hook operation of telephone 100n. In this embodiment, filter 140n acts as a low-pass filter, preventing any low-frequency transients created at telephone 100n from promulgating to digital subscriber line 12.

While circuit 350 protects digital subscriber line 12 from low-frequency transients associated with telephone 100n in an off-hook state, telephones 100 also reduce or eliminate parasitic interference that would otherwise be caused by other telephones 100 remaining in an on-hook state. Because telephones 100a–100m remain in an on-hook state, hook switches 128a–128m remain open. As a result, telephones 100a–100m do not draw additional current associated with being in an off-hook condition. Consequently, saturable core inductors 152 and 154 of each telephone 100a–100m remain in a relatively high impedance state, resulting in a relatively low corner frequency of filters 140a–140m. This relatively high impedance of saturable core inductors 152 and 154 and resulting low corner frequency of filters 140a–140m operate to reduce or eliminate parasitic interference to the off-hook phone 100n.

Although this example describes an embodiment where only one telephone 100n is off-hook, the invention is not so limited. The invention can be applied to any number of telephones 100 and will protect digital subscriber line 12 from any number of simultaneously off-hook telephones 100.

Figure 6:
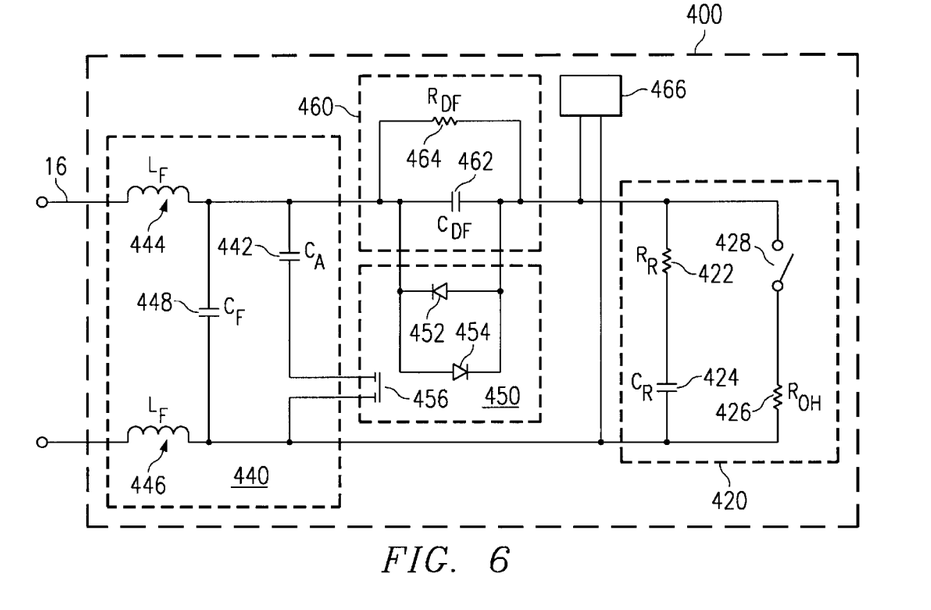
FIG. 6 is a schematic diagram illustrating another exemplary telephone useful, for example, in an ADSL Lite application.

FIG. 6 is a schematic diagram illustrating another exemplary telephone 400 useful, for example, in an ADSL Lite application. Telephone 400 includes an equivalent circuit 420, a filter 440, a switch 450, and a diode switching filter 460. Filter 440, switch 450, and diode switching filter 460 are coupled between circuit 420 and communications link 16. Telephone 400 represents one embodiment of telephone 20n from FIG. 1. In another embodiment, telephone 400 may include circuit 420 and filter 440, without switch 450 or diode switching filter 460.

Circuit 420 includes a ringer load comprising a ringer resistance 422 and a ringer capacitance 424. Circuit 420 also includes a hook switch 428 and an off-hook ringer impedance 426.

In the illustrated embodiment, filter 440 comprises a second order filter having first filter elements 444 and 446 and a second filter element 448. In this particular embodiment, first filter elements 444 and 446 comprise inductors ($L_F$) coupled in series with communications link 16. In the illustrated embodiment, second filter element 448 comprises a filter capacitor ($C_F$) coupled in series with first filter elements 444 and 446, and in parallel with circuit 420. Coupling capacitor 448 in parallel with circuit 420 is generally advantageous to moderate nonlinearities caused by hook switch 428. Component values of first filter elements 444 and 446 and second filter element 448 can be selected to tune filter 440 to the frequency characteristics of telephone 400. This may allow filter 440 to remove transients from digital subscriber line 12 without removing voice signals from digital subscriber line 12. Filter 440 may provide optimum or near optimum performance in telephone 400. The illustrated embodiment of filter 440 is only one example of a design applicable to the present invention. Other configurations and components could be used without departing from the scope of the invention.

In the illustrated embodiment, switch 450 includes a pair of light emitting diodes 452 and 454. Any number of diodes could be used without departing from the scope of the invention. Switch 450 also includes a photo detector 456. Photo detector 456 may comprise, for example, a photo detecting metal-oxide-semiconductor field effect transistor (photo-MOSFET). Any device operable to conduct upon introduction of a light source could be used without departing from the scope of the invention. Photo detector 456 is coupled to an attenuating capacitor 442.

In the illustrated embodiment, diode switching filter 460 includes a diode filter capacitor ($C_{DF}$) 462 and a diode filter resistor ($R_{DF}$) 464 each coupled in parallel with diodes 452 and 454. Diode switching filter 460 operates to attenuate nonlinearities that may be generated by diodes 452 and 454 switching due to, for example, dial pulsing, ringing, or off-hook operation of telephone 400.

Telephone 400 is designed so that light emitting diodes 452 and 454 do not conduct while telephone 400 is in an on-hook state, but do conduct while telephone 400 is in an off-hook state. In operation, while telephone 400 is in an on-hook state, light emitting diodes 452 and 454 do not conduct. While light emitting diodes 452 and 454 remain non-conductive, photo detector 456 also remains non-conductive, eliminating attenuating capacitor 442 from the circuit of filter 440. Thus, while telephone 400 remains on-hook, filter 440 comprises the combination of filter inductors 444 and 446 and filter capacitor 449, resulting in a corner frequency of:

$$1/(2\Omega)(L_F C_F)^{1/2}.$$

Telephone 400 is further designed so that light emitting diodes 452 and 454 conduct when telephone 400 goes off-hook. When light emitting diodes 452 and 454 conduct, photo detector 456 conducts and brings attenuating capacitor 442 into the circuit of filter 440. Therefore, when telephone 400 goes off-hook, the corner frequency of filter 440 is reduced to:

$$1/(2\Omega)(L_F(C_F+C_A))^{1/2}.$$

Through appropriate component selection, the corner frequency of filter 440 during off-hook operation of telephone 400 can be selected to allow voice frequency level signals to pass, while attenuating higher frequency parasitic interference associated with other on-hook telephones 400 in the system.

Telephone 400 may also include a connector 466 coupled to filter 440. Connector 466 facilitates communication between an additional device like an answering machine or a fax machine and digital subscriber line 12. Because filter 440 is coupled between connector 466 and digital subscriber line 12, the additional device coupled to connector 466 may be used without interfering with the higher frequency DSL signals communicated over digital subscriber line 12.

Figure 7:
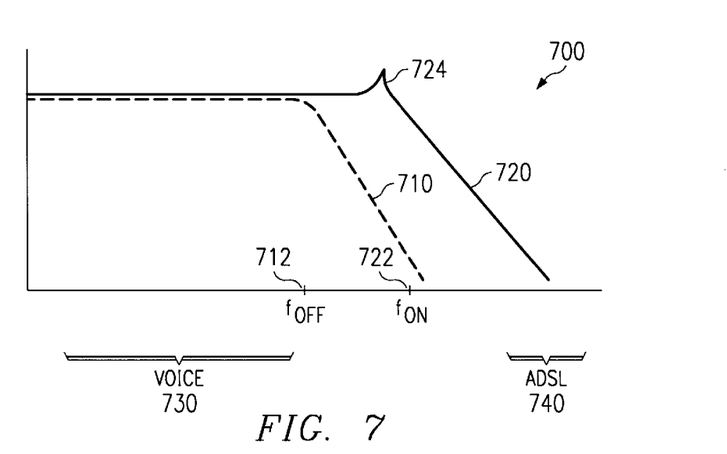
FIG. 7 is a frequency plot illustrating another exemplary frequency response of terminated filters associated with off-hook telephones and another exemplary frequency response of unterminated filters associated with on-hook telephones.

FIG. 7 is a frequency plot 700 illustrating another exemplary frequency response 710 of terminated filters 440 associated with off-hook telephones 400 and another exemplary frequency response 720 of unterminated filters 440 associated with on-hook telephones 400. Components of filter 440 can be selected to provide any desired frequency response. As graphically shown in FIG. 7, while telephone 400 operates in an off-hook state, filter 440 exhibits a corner frequency 712 of $f_{off}$ and allows voice frequency level signals 730 to pass, while attenuating any transients that could adversely affect higher frequency DSL information 740. In addition, parasitic interference associated with unterminated filters 440 in telephones 400 operating in an on-hook state does not affect telephones 400 operating in an off-hook state because that interference occurs at a frequency 722 $f_{on}$ higher than the corner frequency of the filters 440 associated with the off-hook telephones 400. Telephone 400, therefore, provides a filter 440 operable to isolate digital subscriber line 12 from low-frequency transients generated during off-hook operation of telephone 400, while also attenuating parasitic interference associated with other telephones 400 remaining in an on-hook state.

Filter 440 may also be tuned to the frequency characteristics of telephone 400. In this embodiment, the corner frequency 712 of filter 440 is near the upper end of the voice frequency level signals 730. This allows voice frequency level signals 730 to pass, and filter 440 does not filter voice frequency level signals 730. Also, filter 440 will remove transients having a frequency above corner frequency 712. By tuning filter 440 to the frequency characteristics of telephone 400, filter 440 may prevent transients from promulgating to digital subscriber line 12 without preventing voice signals from promulgating to digital subscriber line 12. Filter 440 may provide optimum or near optimum performance in telephone 400.

Figure 8:
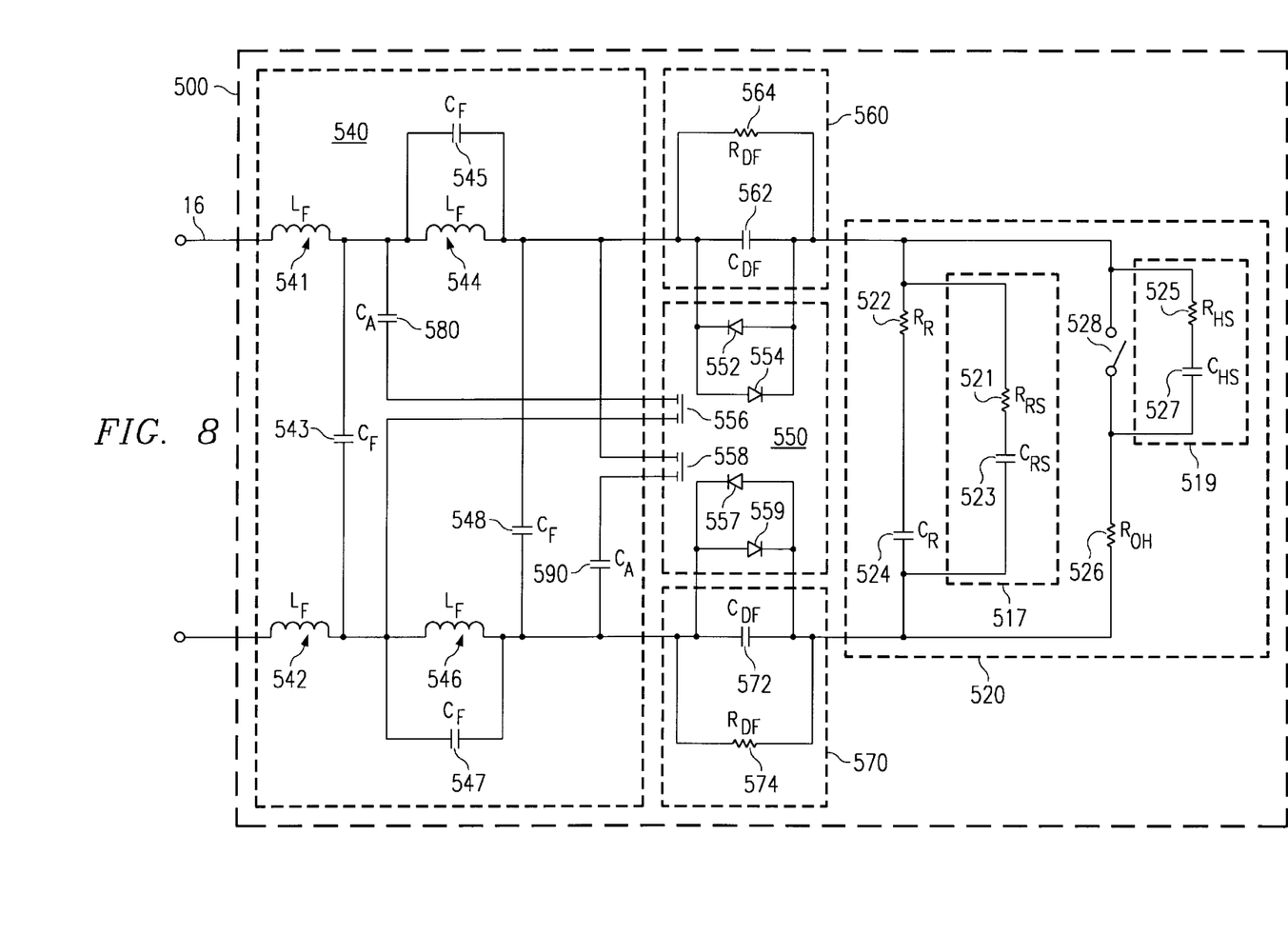
FIG. 8 is a schematic diagram illustrating another exemplary telephone useful, for example, in a full rate ADSL application.

FIG. 8 is a schematic diagram illustrating another exemplary telephone 500 useful, for example, in a full rate ADSL application. Like telephone 400 shown in FIG. 6, telephone 500 includes an equivalent circuit 520 coupled to digital subscriber line 12. Telephone 500 further includes a filter 540, a switch 550, and diode switching filters 560 and 570 coupled between circuit 520 and digital subscriber line 12. Telephone 500 represents one embodiment of telephone 20n from FIG. 1. In another embodiment, telephone 500 may include circuit 520 and filter 540, without switch 550 and diode switching filters 560 and 570.

In the illustrated embodiment, circuit 520 also includes a snubber circuit 517 coupled in parallel with the ringer (represented by ringer resistance 522 and ringer capacitance 524) and a snubber circuit 519 coupled in parallel with one or more hook switches 528. Snubber circuit 517 includes a ringer snubber resistance ($R_{RS}$) 521 and a ringer snubber capacitance ($C_{RS}$) 523. Snubber circuit 519 includes a hook switch snubber resistance ($R_{HS}$) 525 and a hook switch snubber capacitance ($C_{HS}$) 527. Resistor 521 and capacitor 523 operate to moderate or reduce the transients associated with telephone 500 ringing. Resistor 525 and capacitor 527 operate to moderate or reduce transients associated with telephone 500 switching between an on-hook state and an off-hook state. As an example of component values that may be selected in telephone 500, snubber resistors 521 and 525 could each comprise, for example, an approximately 1000 ohm resistor; and snubber capacitors 523 and 527 could each comprise, for example, an approximately 0.01 micro-Farad capacitor. Similar snubber circuits 517 and 519 may be used in telephones 100, 200, and 400 without departing from the scope of the present invention.

Filter 540 is similar in function to filter 440 of telephone 400. To better facilitate operation under full rate ADSL, however, filter 540 comprises a fourth order filter. Like filter 440 in telephone 400, filter 540 can be advantageously designed to couple one or more filter capacitors 543 and 548 in parallel with circuit 520 to moderate nonlinearities typically associated with hook switch 528. Filter 540 may also be tuned to the frequency characteristics of telephone 500. This may allow filter 540 to remove transients from digital subscriber line 12 without removing voice signals from digital subscriber line 12. Filter 540 may provide optimum or near optimum performance in telephone 500.

Switch 550 is also similar in structure and function to switch 450 of telephone 400. Switch 550 includes a pair of light emitting diodes 552 and 554 and another pair of light emitting diodes 557 and 559 all coupled to communications link 16. Telephone 500 is designed so that light emitting diodes 552, 554, 557, and 559 only conduct while telephone 500 is in an off-hook state. Switch 550 also includes photo detectors 556 and 558, which are coupled to attenuating capacitors 580 and 590, respectively. Although the illustrated embodiment shows the use of two sets of light emitting diodes 552, 554 and 557, 559, a single pair of light emitting diodes could be used to activate both photo detectors 556 and 558 without departing from the scope of the present invention.

As an example of component values that may be selected in telephone 500, filter inductances 541, 542, 544, and 546 could each comprise, for example, an approximately 8.6 milli-Henry inductor; filter capacitance 0.543 could comprise, for example, an approximately 0.01 micro-Farad capacitor; filter capacitance 548 could comprise, for example, an approximately 0.022 micro-Farad capacitor; filter capacitances 545 and 547 could each comprise, for example, an approximately 3300 pico-Farad capacitor; attenuating capacitance 580 could comprise, for example, an approximately 0.047 micro-Farad capacitor; and attenuating capacitance 590 could comprise, for example, an approximately 0.0056 micro-Farad capacitor. In another embodiment, filter inductances 541, 542, 544, and 546 could each comprise, for example, an approximately 4.3 milli-Henry inductor; filter capacitance 543 could comprise, for example, an approximately 0.01 micro-Farad capacitor; filter capacitance 548 could comprise, for example, an approximately 0.022 micro-Farad capacitor; filter capacitances 545 and 547 could each comprise, for example, an approximately 0.1 micro-Farad capacitor; attenuating capacitance 580 could comprise, for example, an approximately 0.047 micro-Farad capacitor; and attenuating capacitance 590 could comprise, for example, an approximately 0.0056 micro-Farad capacitor. The configuration and component values of telephone 500 are presented for illustrative purposes only. Other configurations and component values could be used without departing from the scope of the invention.

In the illustrated embodiment, diode switching filter 560 includes a diode filter capacitor ($C_{DF}$) 562 and a diode filter resistor ($R_{DF}$) 564 each coupled in parallel with diodes 552 and 554. Similarly, diode switching filter 570 includes a diode filter capacitor ($C_{DF}$) 572 and a diode filter resistor ($R_{DF}$) 574 each coupled in parallel with diodes 557 and 559. Diode switching filters 560 and 570 operate to attenuate nonlinearities that may be generated by diodes 552, 554, 557, and 559 switching due to, for example, dial pulsing, ringing, or off-hook operation of telephone 500.

As an example of component values that may be selected in telephone 500, diode filter capacitor 562 and diode filter capacitor 572 could each comprise, for example, a 0.1 micro-Farad capacitor, and diode filter resistor 564 and diode filter resistor 574 could each comprise, for example, a 100 ohm resistor. The configuration and component values of telephone 500 are presented for illustrative purposes only. Other configurations and component values could be used without departing from the scope of the invention.

In operation, light emitting diodes 552, 554, 557, and 559 and, therefore, also photo detectors 556 and 558, remain non-conductive while telephone 500 remains on-hook. This effectively isolates attenuating capacitors 580 and 590 from filter 540 while telephone 500 is on-hook. When telephone 500 goes off-hook, light emitting diodes 552, 554, 557, and 559 conduct, causing photo detectors 556 and 558 to also conduct, which brings attenuating capacitors 580 and 590 into filter 540. This reduces the corner frequency of filter 540 while telephone 500 remains off-hook.

As with telephone 400, telephone 500 provides a filter 540 operable to isolate digital subscriber line 12 from low-frequency transients generated during off-hook operation of telephone 500, while also attenuating parasitic interference associated with filters 540 coupled to on-hook telephones 500 in the system. In addition, filter 540 may be tuned to the particular frequency characteristics of telephone 500, allowing filter 540 to provide optimum or near optimum performance in telephone 500.

Figure 9:
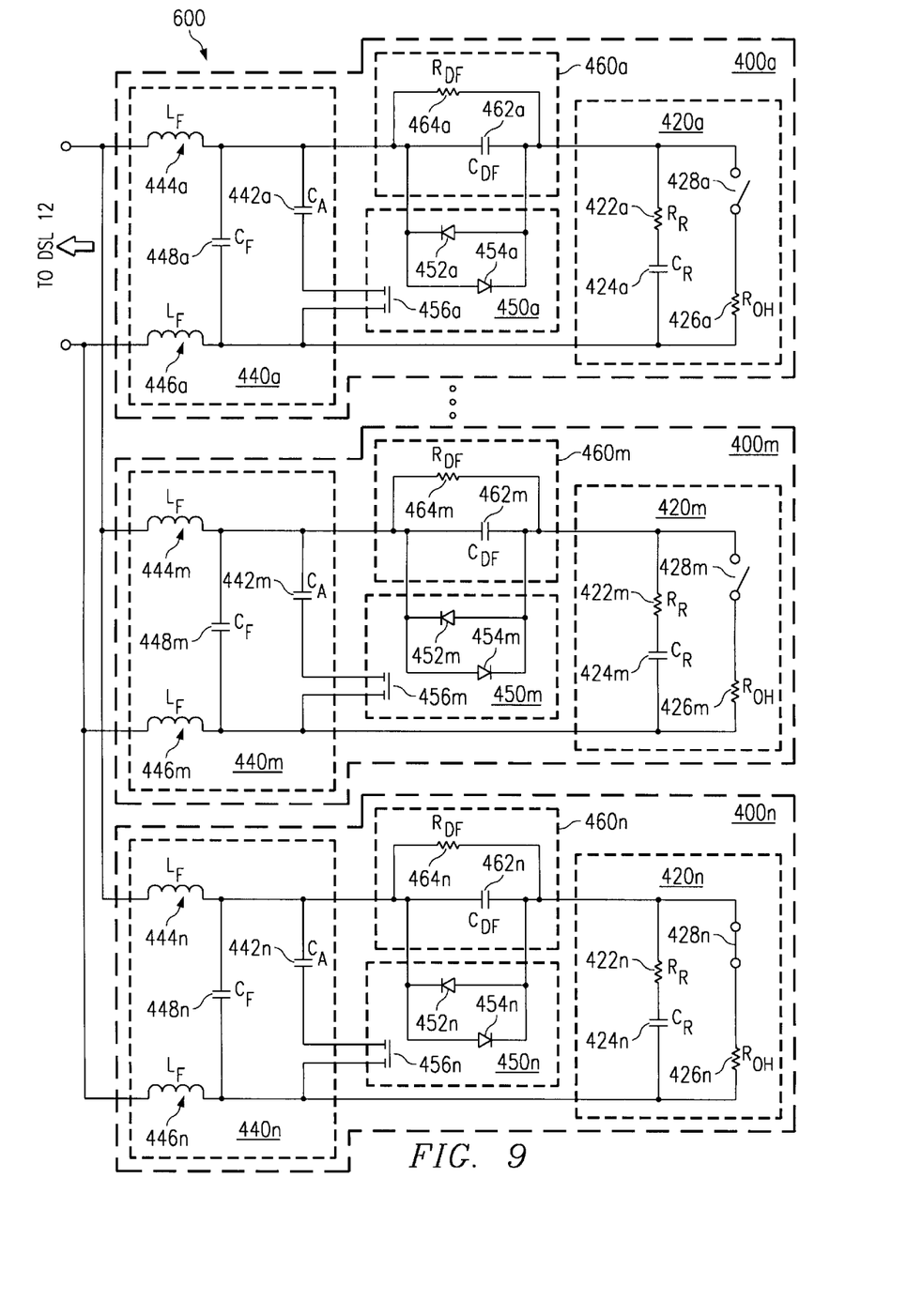
FIG. 9 is a schematic diagram illustrating another circuit operable to facilitate communications using a digital subscriber line and a plurality of telephones.

FIG. 9 is a schematic diagram illustrating another circuit 600 operable to facilitate communications using digital subscriber line 12 and a plurality of telephones 400. Circuit 600 includes a plurality of telephones 400a–400n, which are coupled in parallel with communications link 16. Any number of telephones 400 could be used without departing from the scope of the invention.

Equivalent circuits 420, filters 440, and switches 450 may be the same or similar to elements described with reference to FIG. 6. Each telephone 400 includes a ringer load, represented by ringer resistance 422 and ringer capacitance 424. Each telephone 400 also includes a hook switch 428 and an off-hook ringer impedance 426.

Each filter 440 includes first filter elements 444 and 446 coupled in series with communications link 16, and a second filter element 448 coupled in series with first filter elements 444 and 446 and in parallel with circuit 420. In this embodiment, first filter elements 444 and 446 comprise filter inductors, and second filter element 448 comprises a filter capacitor. Component values of first filter elements 444 and 446 and second filter element 442 can be selected to provide desired filter characteristics, depending on the particular application. For example, component values of first filter elements 444 and 446 and second filter element 448 may be selected to tune filter 440 to the frequency characteristics of telephone 400, allowing filter 440 to remove transients from digital subscriber line 12 without removing voice signals from digital subscriber line 12. Filter 440 may provide optimum or near optimum performance in telephone 400. The illustrated embodiment of filter 440 is only one example of a design applicable to the present invention. Other configurations and components could be used without departing from the scope of the invention.

Each switch 450 comprises a pair of light emitting diodes 452 and 454. Each switch 450 further includes a photo detector 456 coupled to an attenuating capacitor 442. Each telephone 400 is designed so that light emitting diodes 452 and 454 and, therefore, photo detector 456 conduct only when telephone 400 is off-hook. In this way, attenuating capacitor 442 becomes an active circuit element only when telephone 400 is off-hook. When telephone 400 is on-hook, attenuating capacitor 442 becomes effectively isolated from the rest of circuit 600. Through this configuration, the corner frequency of filters 440 associated with telephones 400 operating in an off-hook state is lower than the corner frequency of filters 440 associated with telephones 400 operating in an on-hook state. Through appropriate component selection, the corner frequency of filter 440 during off-hook operation of telephone 400 can be selected to allow voice frequency level signals to pass, while attenuating higher frequency parasitic interference associated with other on-hook telephones 400 in the system.

In the example shown in FIG. 9, telephones 400a–400m are depicted as being in an on-hook state. In other words, telephones 400a–400m are not currently in use. Telephone 400n, in contrast, is depicted as being in an off-hook state. When telephone 400n is in an off-hook state, there is a potential that low-frequency transients will be created at telephone 400n, which could cause errors or irregularities in digital information communicated over digital subscriber line 12. It is, therefore, desirable to ensure that these low-frequency transients are not promulgated to digital subscriber line 12. Circuit 600 accomplishes this objective through the cooperation of filters 440 and switches 450.

Prior to telephone 400n going off-hook, light emitting diodes 452 and 454 and photo detector 456 do not conduct, which effectively isolate attenuating capacitor 442 from the rest of circuit 600. When telephone 400n goes off-hook and hook switch 428n closes, the threshold voltage of light emitting diodes 452 and 454 is exceeded, causing them to conduct and emit light. This activates photo detector 456, bringing attenuating capacitor 442 into filter 440n, and reducing the corner frequency of filter 440n. At that point, filter 440n operates to isolate digital subscriber line 12 from any low-frequency transients generated by off-hook telephone 400n.

While circuit 600 protects digital subscriber line 12 from low-frequency transients associated with telephone 400n in an off-hook state, circuit 600 also reduces or eliminates parasitic interference that would otherwise be caused by unterminated filters 440 associated with telephones 400a–400m remaining in an on-hook state. Because telephones 400a–400m remain in an on-hook state, hook switches 428a–428m remain open. As a result, light emitting diodes 452 and 454 and photo detector 456 remain non-conductive and attenuating capacitor 442 remains isolated from the rest of circuit 600. This results in the parasitic interference associated with unterminated filters 440a–440m associated with on-hook telephones 400a–400m, respectively, occurring at a frequency above the corner frequency of filter 440n associated with off-hook telephone 400n. This arrangement, therefore, reduces or eliminates the effects of the parasitic interference on off-hook telephone 400n.

Although this example describes an embodiment where only one telephone is off-hook, the invention is not so limited. The invention can be applied to any number of telephones 400 and will protect digital subscriber line 12 from any number of simultaneously off-hook telephones.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication apparatus comprising:
    a communication device coupled to a digital subscriber line and operable to facilitate communication over a digital subscriber line; and
    a filter operable to be coupled between the communication device and the digital subscriber line, the filter having a corner frequency and being operable to attenuate transients associated with the communication device when the communication device is in use, the filter tuned to an impedance of the communication device.

2. The communication apparatus of claim 1, wherein the filter comprises one of a second order filter, a fourth order filter, and a sixth order filter.

3. The communication apparatus of claim 1, wherein the filter comprises:
    a first filter element operable to be coupled in series between the digital subscriber line and the communication device; and
    a second filter element coupled in series with the first filter element and in parallel with the communication device.

4. The communication apparatus of claim 3, wherein the first filter element comprises a filter inductor, and 25 wherein the second filter element comprises a filter capacitor.

5. The communication apparatus of claim 3, further comprising a switch coupled to the filter and operable to effect a change in the corner frequency of the filter depending on whether the communication device is in use, the change in the corner frequency operating to attenuate parasitic interference associated with a second communication device coupled to the digital subscriber line when the second communication device is not in use.

6. The communication apparatus of claim 5, further comprising an attenuating capacitor coupled in parallel with the second filter element and in series with the switch;
    wherein the switch is operable to conduct when the communication device is in use to couple the attenuating capacitor to the filter and reduce the corner frequency of the filter; and wherein the switch is also operable to remain open when the apparatus is not in use to remove the attenuating capacitor from the filter and increase the corner frequency of the filter.

7. The communication apparatus of claim 6, wherein the switch comprises:

a light emitting diode operable to be coupled between the digital subscriber line and the communication device and to illuminate only when the communication device is in use;

a photo detector switch coupled to the attenuating capacitor and operable to couple the attenuating capacitor to the filter in response to the light emitting diode illuminating when the communication device is in use.

8. The communication apparatus of claim 5, wherein the switch comprises a saturable core inductor coupled in series with the filter;

the saturable core inductor comprising a core operable to saturate when exposed to a current associated with the communication device being in use to reduce the impedance of the saturable core inductor and increase, the corner frequency of the filter;

the core also operable to discharge when exposed to a current associated with the communication device not being in use to increase the impedance of the saturable core inductor and decrease the corner frequency of the filter.

9. The communication apparatus of claim 8, wherein the core of the saturable core inductor comprises ferrite having a permeability of approximately 900 $\mu$.

10. The communication apparatus of claim 8, wherein the saturable core inductor comprises a non-gapped toroid.

11. The communication apparatus of claim 1, wherein the communication device comprises:

a transmitter operable to convert analog signals into electrical signals; and a receiver operable to convert electrical signals into analog signals.

12. The communication apparatus of claim 1, further comprising a connector coupled to the filter, the connector operable to be coupled to an additional device, the additional device operable to communicate over the digital subscriber line.

13. The communication apparatus of claim 1, wherein the communication device comprises a device selected from a group consisting of a telephone, an answering machine, a fax machine, a satellite dish, and a personal television receiver.

14. The communication apparatus of claim 1, wherein the filter resides within the communications device.

15. In a system including a plurality of communication devices coupled to a digital subscriber line, a circuit operable to facilitate communication using the digital subscriber line comprises:

a filter having a corner frequency and being operable to be coupled between one of the plurality of communication devices and the digital subscriber line, the filter also operable to attenuate transients associated with the communication device operating in an active state, the filter tuned to an impedance of the communication device coupled thereto; and a switch coupled to the filter and operable to effect a change in the corner frequency of the filter depending on whether the communication device coupled to the filter is operating in an active or an inactive state, the change in the corner frequency operating to attenuate parasitic interference associated with one or more others of the plurality of communication devices operating in the inactive state when at least one of the plurality of communication devices switches to an active state.

16. The circuit of claim 15, wherein the filter comprises:

a first filter element operable to be coupled in series between the digital subscriber line and the communication device; and a second filter element coupled in series with the first filter element and operable to be coupled in parallel with the communication device.

17. The circuit of claim 16, wherein the first filter element comprises a filter inductor, and wherein the second filter element comprises a filter capacitor.

18. The circuit of claim 16, wherein the switch is coupled in series with an attenuating capacitor coupled in parallel with the second filter element;

wherein the switch is operable to remain open while the communication device is in the inactive state to eliminate the attenuating capacitor from the circuit and increase the corner frequency of the filter; and wherein the switch is also operable to conduct while the communication device is in the active state to include the attenuating capacitor in the circuit and reduce the corner frequency of the filter.

19. The circuit of claim 18, wherein the switch comprises:

a light emitting diode operable to be coupled between the digital subscriber line and the communication device and to illuminate only when the communication device is in the active state; and a photo detector switch coupled to the attenuating capacitor and operable to conduct to couple the attenuating capacitor to the filter in response to the light emitting diode illuminating when the communication device is in the active state.

20. The circuit of claim 15, wherein the switch comprises a saturable core inductor coupled in series with the filter;

the saturable core inductor comprising a core operable to saturate when exposed to a current associated with the active state of the communication device to reduce the impedance of the saturable core inductor and increase the corner frequency of the filter;

the core also operable to discharge when exposed to a current associated with the inactive state of the communication device to increase the impedance of the saturable core inductor and decrease the corner frequency of the filter.

21. The circuit of claim 20, wherein the core of the saturable core inductor comprises ferrite having a permeability of approximately 900 $\mu$.

22. The circuit of claim 20, wherein the saturable core inductor comprises a non-gapped toroid.

23. The circuit of claim 15, wherein the circuit is integral with one of the communication devices.

24. The circuit of claim 23, further comprising circuitry coupled to the filter and operable to facilitate communication over the digital subscriber line.

25. The circuit of claim 24, wherein the circuitry comprises:

a transmitter operable to convert analog signals into electrical signals; and a receiver operable to convert electrical signals into analog signals.

26. The circuit of claim 15, wherein the plurality of communication devices comprise a device selected from a group consisting of a telephone, an answering machine, a fax machine, a satellite dish, and a personal television receiver.

27. A method for manufacturing a communication apparatus, comprising:

determining an impedance of a communication device coupled to a digital subscriber line and operable to facilitate communication over a digital subscriber line;

forming a filter operable to be coupled between the digital subscriber line and the communication device, the filter having a corner frequency and being operable to attenuate transients associated with the communication device when the communication device is in use, the filter tuned to the impedance of the communication device; and coupling the filter to the communication device.

28. The method of claim 27, wherein the filter comprises one of a second order filter, a fourth order filter, and a sixth order filter.

29. The method of claim 27, wherein the filter comprises:

a first filter element operable to be coupled in series between the digital subscriber line and the communication device;

a second filter element coupled in series with the first filter element and in parallel with the communication device.

30. The method of claim 29, wherein the first filter element comprises a filter inductor, and wherein the second filter element comprises a filter capacitor.

31. The method of claim 29, further comprising coupling a switch to the filter, the switch operable to effect a change in the corner frequency of the filter depending on whether the communication device is in use, the change in the corner frequency operating to attenuate parasitic interference associated with a second communication device coupled to the digital subscriber line when the second communication device is not in use.

32. The method of claim 31, further comprising coupling an attenuating capacitor in parallel with the second filter element and in series with the switch;

wherein the switch is operable to conduct when the communication device is in use to couple the attenuating capacitor to the filter and reduce the corner frequency of the filter; and wherein the switch is also operable to remain open when the communication device is not in use to remove the attenuating capacitor from the filter and increase the corner frequency of the filter.

33. The method of claim 32, wherein the switch comprises:

a light emitting diode operable to be coupled between the digital subscriber line and the communication device and to illuminate only when the communication device is in use; and a photo detector switch coupled to the attenuating capacitor and operable to couple the attenuating capacitor to the filter in response to the light emitting diode illuminating when the communication device is in use.

34. The method of claim 31, wherein the switch comprises a saturable core inductor coupled in series with the filter;

the saturable core inductor comprising a core operable to saturate when exposed to a current associated with the communication device being in use to reduce the impedance of the saturable core inductor and increase the corner frequency of the filter;

the core also operable to discharge when exposed to a current associated with the communication device not being in use to increase the impedance of the saturable core inductor and decrease the corner frequency of the filter.

35. The method of claim 34, wherein the core of the saturable core inductor comprises ferrite having a permeability of approximately 900 $\mu$.

36. The method of claim 34, wherein the saturable core inductor comprises a non-gapped toroid.

37. The method of claim 27, wherein the communication device comprises:

a transmitter operable to convert analog signals into electrical signals; and a receiver operable to convert electrical signals into analog signals.

* * * * *

UNITED STATES PATENT AND TRADEMARK OFFICE
CERTIFICATE OF CORRECTION

PATENT NO. : 6,473,507 B1 Page 1 of 1
DATED : October 29, 2002
INVENTOR(S) : Christopher Q. Eckert It is certified that error appears in the above-identified patent and that said Letters Patent is hereby corrected as shown below:

<u>Title page,</u>
Item [45], Date of Patent:, insert -- * -- prior to "Oct. 29, 2002".
Item [*] Notice, after "42 days.", insert -- This patent is subject to a terminal disclaimer. --.

Signed and Sealed this

Nineteenth Day of August, 2003

JAMES E. ROGAN
*Director of the United States Patent and Trademark Office*